(12) United States Patent (10) Patent No.: US 7,641,282 B2
Hinata et al. (45) Date of Patent: Jan. 5, 2010

(54) LOCKING DEVICE FOR SEAT BACK

(75) Inventors: Takao Hinata, Kanagawa-ken (JP); Yoshihiko Yamauchi, Kanagawa-ken (JP); Ryuji Sugita, Kanagawa (JP)

(73) Assignees: Johnson Controls Technology Company, Holland, MI (US); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/188,052

(22) Filed: Aug. 7, 2008

(65) Prior Publication Data

US 2009/0039687 A1 Feb. 12, 2009

(30) Foreign Application Priority Data

Aug. 10, 2007 (JP) ............................. 2007-210009

(51) Int. Cl.
*B60R 21/00* (2006.01)
*B60N 2/02* (2006.01)
(52) U.S. Cl. ............................. 297/216.14; 297/378.13
(58) Field of Classification Search ............ 297/378.13, 297/216.13, 216.14; 296/65.17
See application file for complete search history.

(56) References Cited

U.S. PATENT DOCUMENTS

| 4,684,175 | A | * | 8/1987 | Trutter | .................. | 297/378.13 |
| 5,562,325 | A | * | 10/1996 | Moberg | .................. | 297/378.13 |
| 5,664,839 | A | * | 9/1997 | Pedronno et al. | ........ | 297/378.13 |
| 6,312,055 | B1 | * | 11/2001 | Uematsu | ................ | 297/378.13 |

FOREIGN PATENT DOCUMENTS

JP 2000-326774 11/2000

OTHER PUBLICATIONS

Patent Abstracts of Japan, 2000-326774.

* cited by examiner

*Primary Examiner*—Milton Nelson, Jr.
(74) *Attorney, Agent, or Firm*—Foley & Lardner LLP

(57) ABSTRACT

A locking device for a seat back includes a release preventing mechanism for preventing the locking device from being unintendedly released by the fact that a second arm portion of a lift lever abuts on a side edge portion of a guide hole of a lock plate to cause the lift lever to rotate positively when a base plate rotates forward along a horizontal direction about a lock pin in a state where the lock pin engages with a lock hole of the lock plate and the second arm portion of the lift lever is located in the guide hole of the lock plate when the seat back is held at a rising position.

5 Claims, 13 Drawing Sheets

LOCKING DEVICE FOR SEAT BACK

BACKGROUND OF THE INVENTION

1. Field of the Invention

The present invention relates to a locking device capable of holding a seat back of a vehicle seat at a predetermined rising angle.

2. Description of the Related Art

This type of locking device for a seat back is disclosed in Japanese Patent No. 3810944.

The locking device for a seat back, which is disclosed in Japanese Patent No. 3810944, urges a lock pin provided on a base plate which is fixed to the seat back by means of a spring, engages the lock pin with one of the lock holes bored on a lock plate fixed to a vehicle body, and thereby holds the seat back at a predetermined rising angle. Onto the base plate, a lift lever having two arm portions is pivotally attached. This lift lever is held at an initial position by an urging force of the spring. Meanwhile, in the lock plate, a guide hole is formed, into which one of such arms of the lift lever can enter when the seat back is held at a rising position. At the time of rising rotation of the seat back, one of the arm portions of the lift lever is popped up by a front end edge of the guide hole of the lock plate, and the lift lever is rotated positively (rotated backward) from the initial position. When one of the arms is rotated positively from the initial position as described above, the other arm portion moves the lock pin in a release direction, whereby the lock pin is lifted up above the base plate. In such a way, the lock pin is prevented from colliding with the base plate. Then, at the time of getting over the front end edge of the lock plate, one of the arms of the lift lever is rotated reversely (rotated forward) by the urging force of the spring, and enters into the guide hole. Then, the lock pin is urged downward by the urging force of the spring, whereby the lock pin enters into the lock hole, and is engaged with the lock hole concerned. In such a way, the seat back is held at a predetermined rising position.

In accordance with the locking device as described above, at the time of the rising rotation of the seat back, one of the arms of the lift lever and the front end edge of the guide hole of the lock plate play roles of sensors, whereby the lock pin is smoothly locked without colliding with the lock plate.

SUMMARY OF THE INVENTION

Here, in the case where the seat back is divided into plural pieces in a vehicle width direction, each divided piece of the seat back is not supported by both ends in the vehicle width direction by the locking device, but is supported by one end in the vehicle width direction thereby. Accordingly, if baggage and the like hit the seat back from rear of the vehicle owing to a vehicle collision and the like in a state where the seat back is rising, then the seat back tends to rotate in a substantially horizontal direction about the lock pin as a rotation center. At this time, the base plate fixed to the seat back tends to rotate forward about the lock pin along the substantially horizontal direction. If such a load applied from the rear is large, then the lock plate rotates largely, causing an apprehension that one of the arms of the lift lever located in the guide hole of the lock plate may abut on a side edge of the guide hole of the lock plate, and may rotate (rotate positively) in a direction of releasing the lock pin.

In this connection, it is an object of the present invention, in the locking device for the seat back, to prevent such a release of the lock pin, which is caused by the lift lever in the case where the large load is applied to the seat back from the rear of the vehicle toward front of the vehicle.

A locking device for a seat back, according to a first aspect of the present invention, including: a lock plate fixed to a vehicle body and having one or more lock holes; a base plate fixed to a seat back; a lock pin freely slidably supported on the base plate and urged by first urging means, the lock pin entering into one of the lock holes of the lock plate at a predetermined rising angle, thereby holding the seat back at the predetermined rising angle; a lift lever having a first arm portion and a second arm portion and pivotally attached onto the base plate, the lift lever being urged to an initial position by second urging means; and a guide hole formed in the lock plate, the guide hole allowing the second arm portion of the lift lever to enter thereinto when the seat back is held at a rising position, in which, when the seat back is rotated to rise, the second arm portion is lifted up by a front end edge of the guide hole, and rotates positively from the initial position, and then enters into the guide hole while rotating reversely, whereby the first arm portion pushes up the lock pin to thereby avoid the lock pin colliding with the lock plate, and thereafter, the first arm portion permits the lock pin to enter into the lock hole, wherein, on the base plate, there is provided a step difference portion that prevents the lift lever from rotating positively by a fact that the second arm portion of the lift lever abuts on a side edge portion of the guide hole of the lock plate when the base plate rotates forward about the lock pin along a horizontal direction in an occasion where a load is applied to the seat back from rear when the seat back is held at the rising position.

A locking device for a seat back, according to a second aspect of the present invention, including: a lock plate fixed to a vehicle body and having one or more lock holes; a base plate fixed to a seat back; a lock pin freely slidably supported on the base plate and urged by first urging means, the lock pin entering into one of the lock holes of the lock plate at a predetermined rising angle, thereby holding the seat back at the predetermined rising angle; a lift lever having a first arm portion and a second arm portion and pivotally attached onto the base plate, the lift lever being urged to an initial position by second urging means; and a guide hole formed in the lock plate, the guide hole allowing the second arm portion of the lift lever to enter thereinto when the seat back is held at a rising position, in which, when the seat back is rotated to rise, the second arm portion is lifted up by a front end edge of the guide hole, and rotates positively from the initial position, and then enters into the guide hole while rotating reversely, whereby the first arm portion pushes up the lock pin to thereby avoid the lock pin colliding with the lock plate, and thereafter, the first arm portion permits the lock pin to enter into the lock hole, wherein a cutout that prevents the second arm portion of the lift lever from abutting on a peripheral edge portion of the guide hole of the lock plate when the base plate rotates forward about the lock pin along a horizontal direction when the seat back is held at the rising position is provided on at least a part of or over entirety of a side edge portion of the guide hole of the lock plate on an opposite side to the lock pin among a peripheral edge of the guide hole of the lock plate.

In accordance with the first aspect of the present invention, when the large load is applied to the seat back from the rear of the vehicle toward the front of the vehicle, for example, at the time of the vehicle collision, and the base plate rotates forward about the lock pin along the horizontal direction, even if the second arm portion of the lift lever abuts on the side edge portion of the guide hole of the lock plate, and the lift lever is going to rotate positively, the lift lever is inhibited from rotating positively by the step difference portion of the base plate. Accordingly, when the large load is applied to the seat back from the rear of the vehicle toward the front of the vehicle, for example, at the time of the vehicle collision, the locking device can be prevented from being released.

In accordance with the second aspect of the present invention, even if the large load is applied to the seat back from the rear of the vehicle toward the front of the vehicle, for example, at the time of the vehicle collision, and the base plate rotates forward about the lock pin along the horizontal direction, the cutout is provided on the lock plate, whereby such a portion where the second arm portion of the lift lever abuts on the peripheral edge portion of the guide hole of the lock plate is eliminated, and the second arm portion of the lift lever is not caused to rotate positively. Accordingly, there is eliminated such a portion that is going to positively rotate the second arm portion of the lift lever when the large load is applied to the seat back from the rear of the vehicle toward the front of the vehicle, for example, at the time of the vehicle collision. Therefore, the locking device can be prevented from being released.

BRIEF DESCRIPTION OF THE DRAWINGS

FIG. 11A is a view showing a state of the lift plate before the load is applied thereto; and FIG. 11B is a view showing a state of the lift plate to which the load is applied.

FIG. 13 is a cross-sectional view of the lock plate according to the second embodiment, taken along a line XIII-XIII in

DESCRIPTION OF THE PREFERRED EMBODIMENT

A description will be made below of embodiments of the present invention based on the drawings.

First Embodiment

First, a description will be made below of a first embodiment of the present invention while referring to FIGS. 1 to 11.

Figure 1:
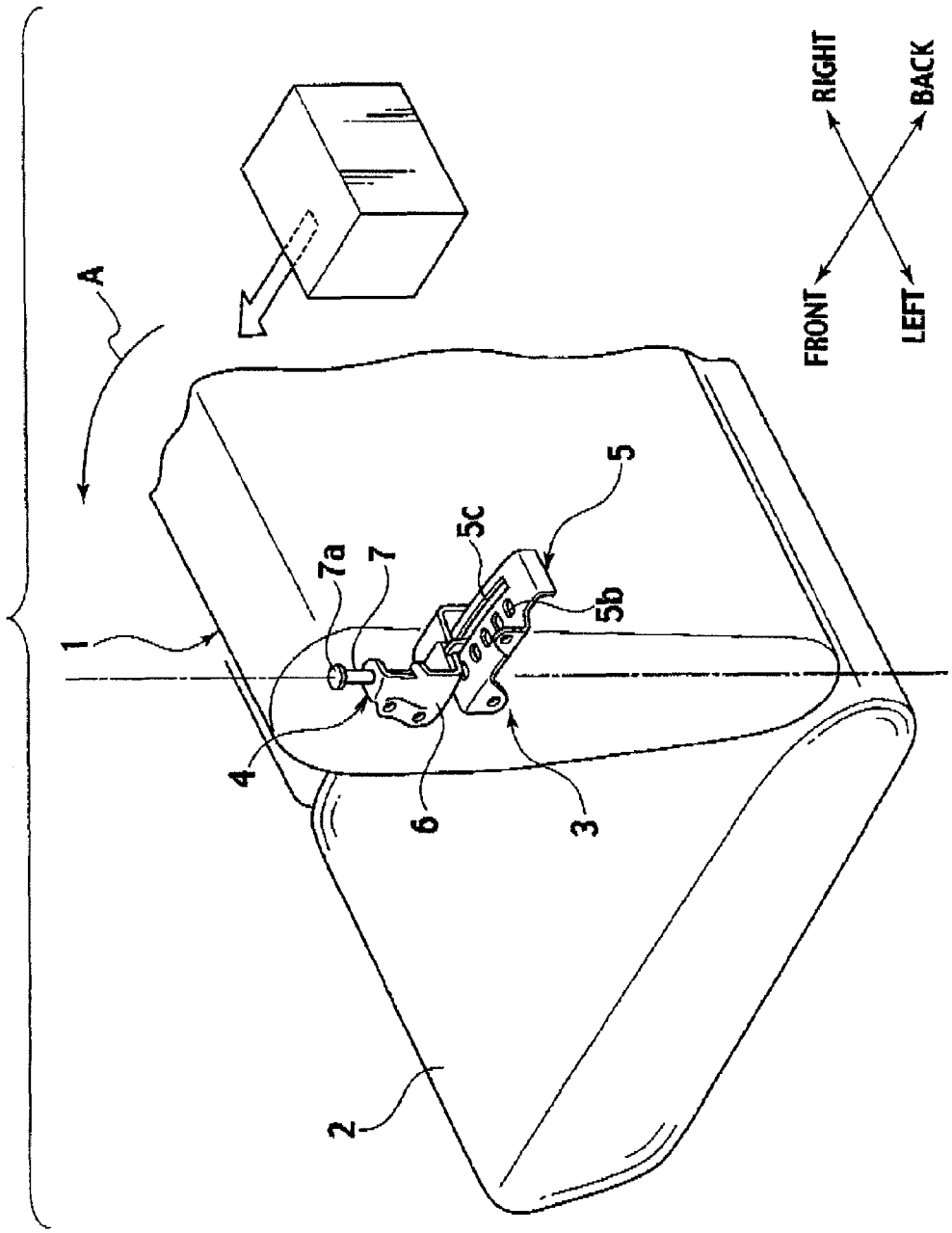
FIG. 1 is a perspective view of a seat back equipped with a locking device of a first embodiment of the present invention.
Figure 2:
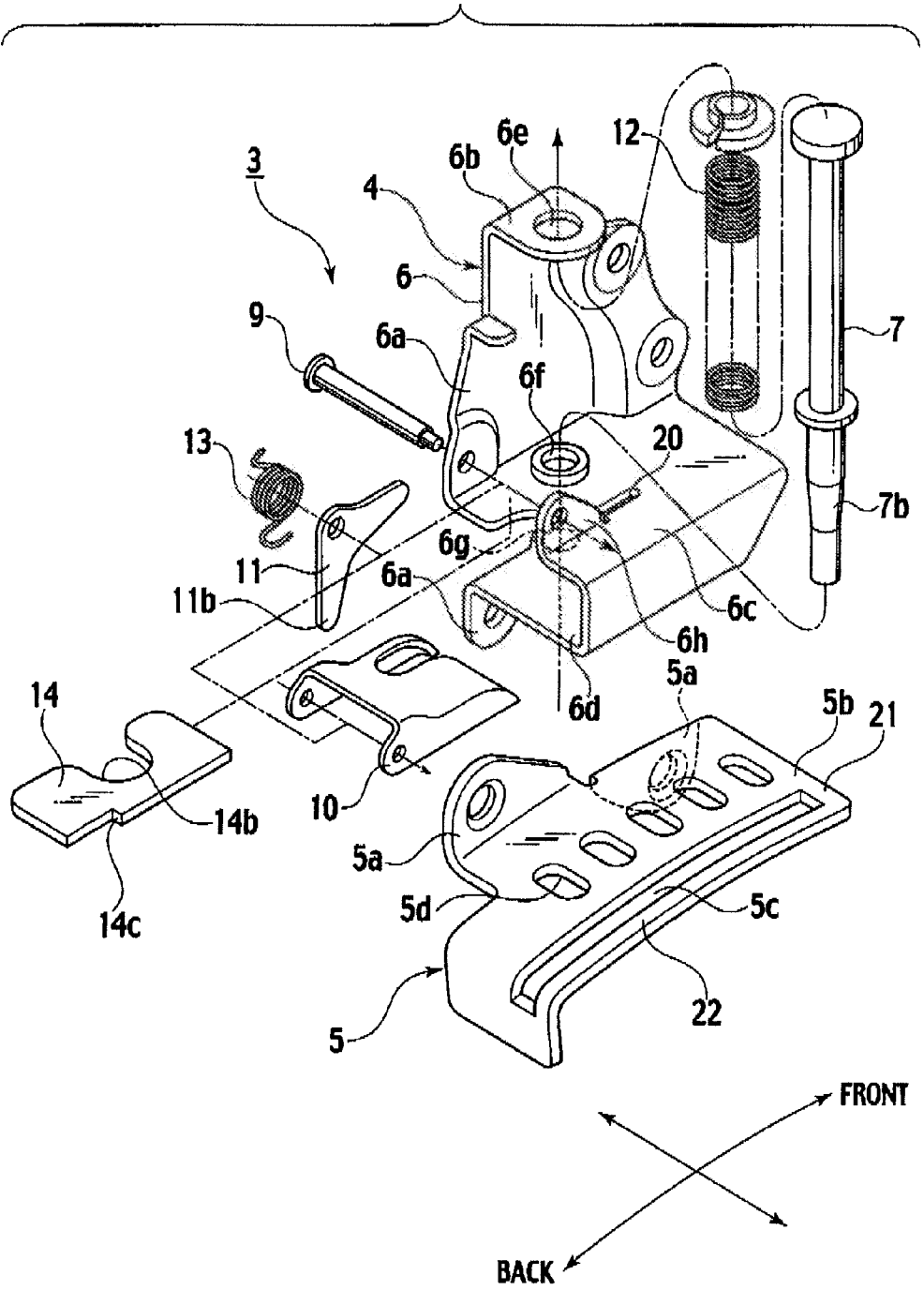
FIG. 2 is an exploded perspective view of the locking device of the first embodiment.
Figure 3:
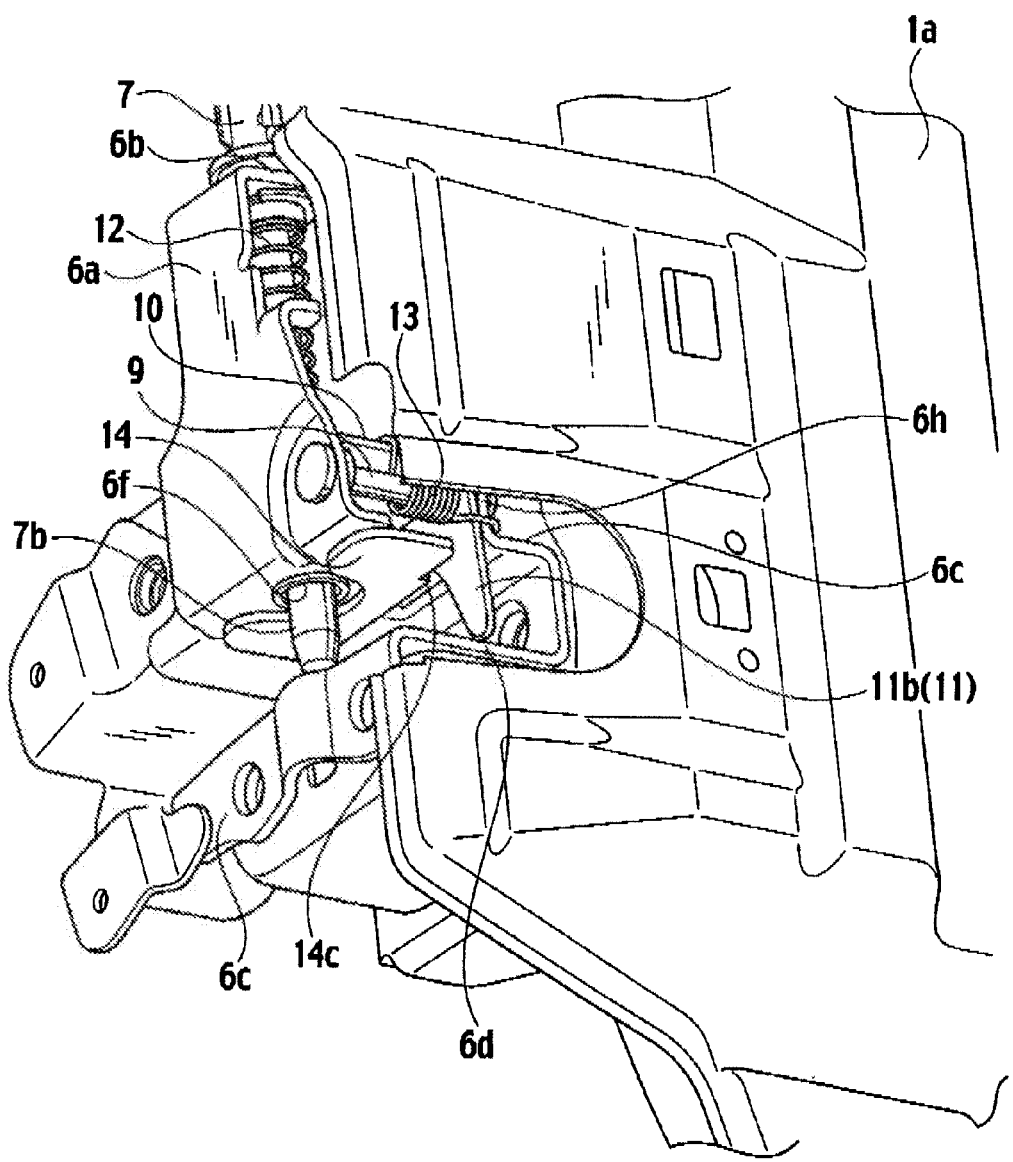
FIG. 3 is a perspective view of a locking mechanism of the locking device of the first embodiment.
Figure 4:
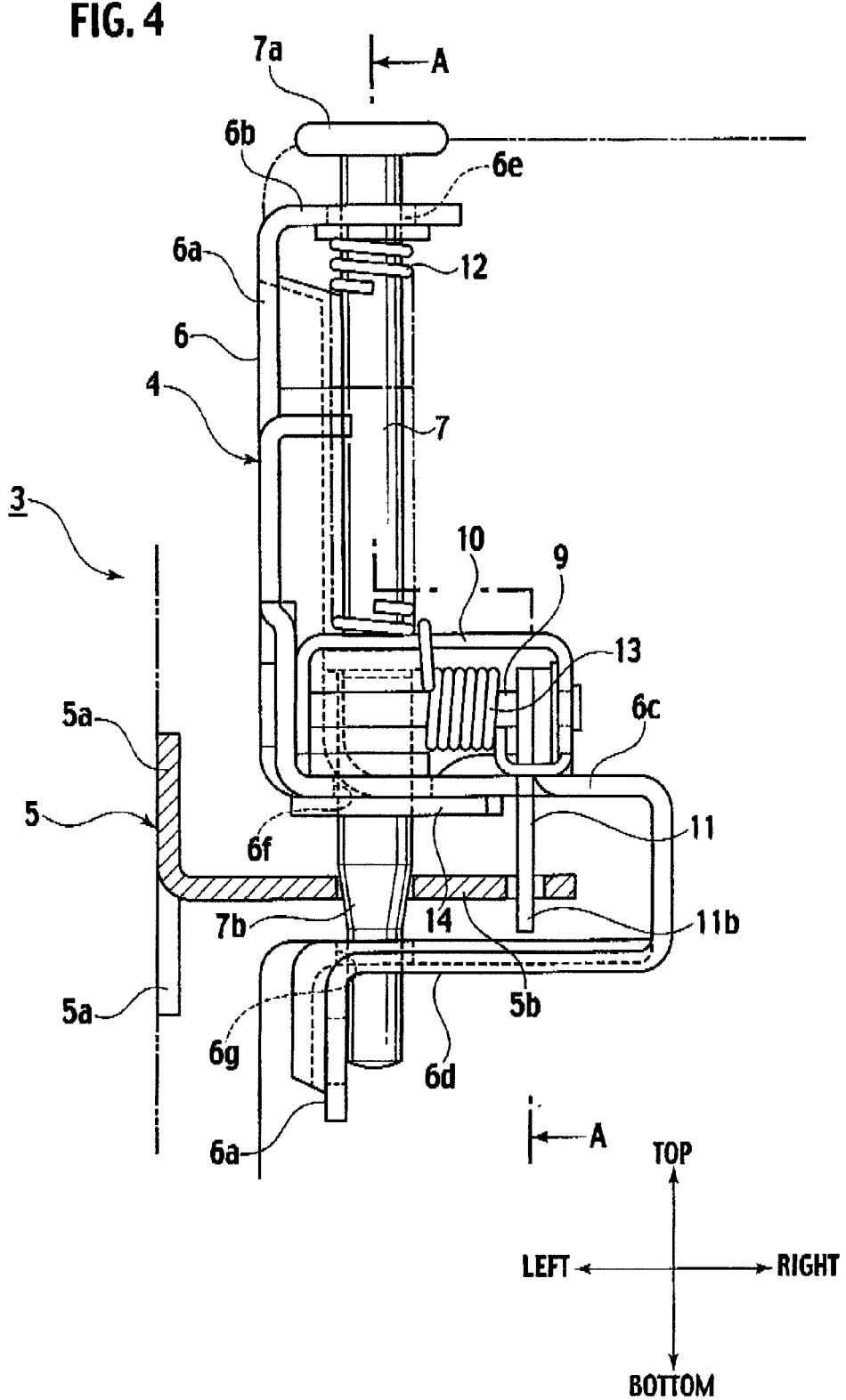
FIG. 4 is a front view of a longitudinal cross section of the locking device of the first embodiment.

In FIG. 1, reference numeral 1 denotes a seat back of a vehicle rear seat, and reference numeral 2 denotes a seat cushion of the vehicle rear seat. The seat back 1 is supported by the seat cushion 2 while interposing a hinge mechanism (not shown), and is adapted to be rotatable between a rising position and a forward inclined position.

Onto the seat back 1, a locking device 3 is attached, which locks the seat back 1 at a predetermined rising angle or releases the locked seat back 1.

The locking device 3 is composed by including: a locking mechanism 4 disposed on an upper portion of both sides in a vehicle width direction in the seat back 1; and a lock plate 5 fixed to a vehicle body at a position opposite to the locking mechanism 4.

The locking mechanism 4 is composed by including: a base plate 6; a lock pin 7; a shaft 9; a lift plate 10; a lift lever 11; a compression spring 12 as first urging means; and a coil spring 13 as second urging means.

The base plate 6 is composed by including: an attachment piece 6a oriented in the vertical direction; and an upper support piece 6b, an intermediate support piece 6c, and a lower support piece 6d, which are protruded from the attachment piece 6a in the horizontal direction. The intermediate support piece 6c and the lower support piece 6d are coupled to each other by a coupling piece extended in the vertical direction. In the respective support pieces 6b, 6c and 6d, support holes 6e, 6f and 6g are formed to penetrate therethrough, respectively. These support holes 6e, 6f and 6g are arrayed in line.

The lock pin 7 is inserted into the support holes 6e, 6f and 6g, and is supported thereby so as to be vertically movable. On an upper end of the lock pin 7, a disc-like flange portion 7a protruding to the outside of the seat back 1 is provided. A lower end of the lock pin 7 becomes an engagement portion 7b capable of being engaged with and disengaged from one of lock holes 5d of the lock plate 5, which are to be described later, by entering thereinto and retreating therefrom. This engagement portion 7b has a tapered portion in which a diameter is gradually reduced downward so as to allow the engagement portion 7b to smoothly enter into the lock hole 5d.

In the intermediate support piece 6c of the base plate 6, a slit portion 20 is formed, and a support portion 6h is formed as well that is cut and raised from a peripheral edge of the slit portion 20. This support portion 6h is disposed opposite to the attachment piece 6a, and the shaft 9 extended in the horizontal direction is axially supported across these support portion 6h and attachment piece 6a.

Onto the shaft 9, the lift plate 10 is pivotally attached, and the lift lever 11 is pivotally attached. The lift lever 11 pivotally attached onto the shaft 9 is housed in the slit portion 20 of the intermediate support piece 6c, and is permitted to rotate.

The compression spring 12 as the first urging means urges the lock pin 7 in the engagement direction (downward in the respective drawings). Moreover, with regard to the coil spring 13 as the second urging means, one end thereof is latched on the lift plate 10, and the other end is latched on the base plate 6. The coil spring 13 urges the lift lever 11 to an initial position shown in FIG. 5 in cooperation with the compression spring 12.

Figure 5:
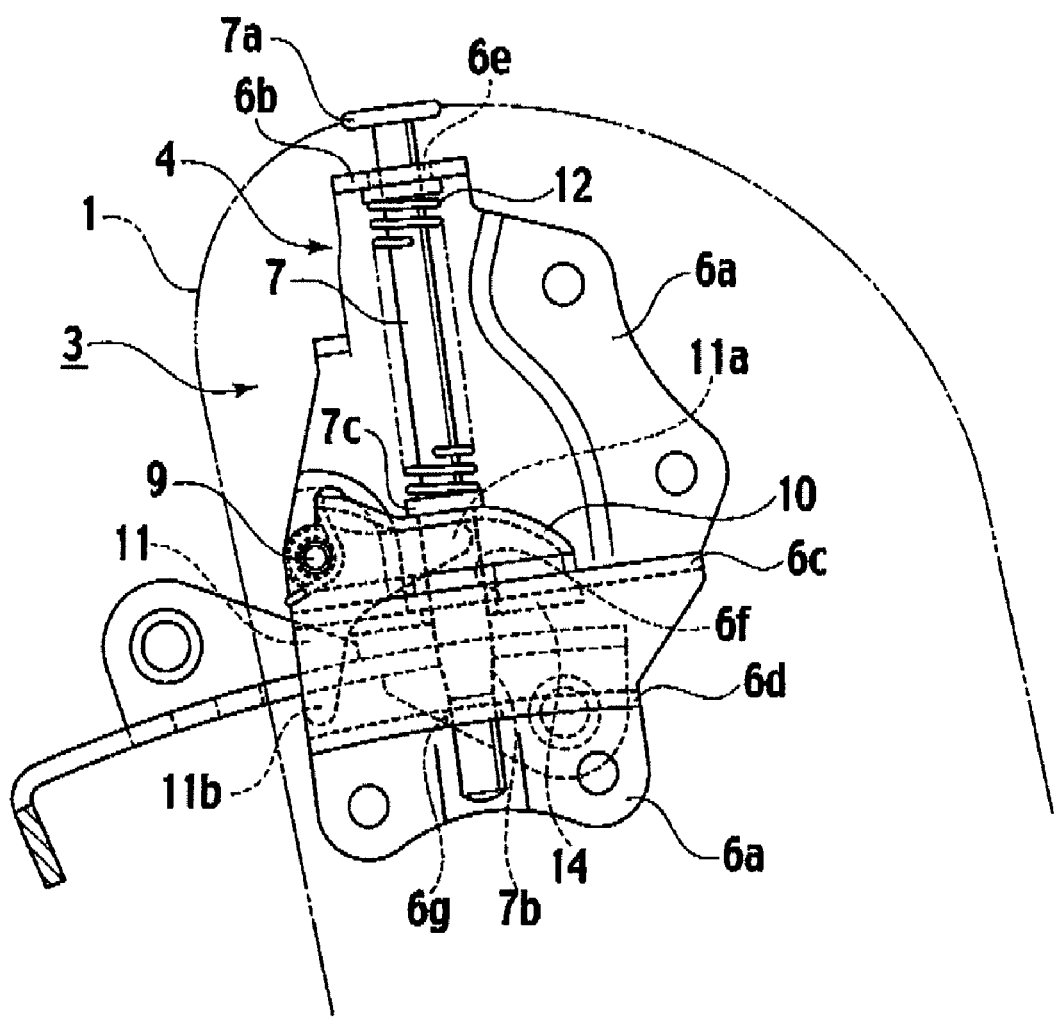
FIG. 5 is a side view of the locking device of the first embodiment in a locked state.

The lift lever 11 has: a first arm portion 11a capable of abutting on a lower surface of the lift plate 10; and a second arm portion 11b extended downward between the intermediate support piece 6c and the lower support piece 6d. As shown in FIG. 5, usually, the lift lever 11 is held by the coil spring 13 at an initial position where the second arm portion 11b is oriented substantially directly downward.

Usually, the lift plate 10 is held at a horizontal position of abutting on the intermediate support piece 6c.

With regard to the lock pin 7, a collar portion 7c thereof is pushed up in such a manner that the lift plate 10 is rotated in a release direction (clockwise direction in FIG. 5) through the lift lever 11, and then the lock pin 7 is moved to a release position where the engagement portion 7b is disengaged from the lock hole 5d.

The lock plate 5 is fixed to the vehicle body by bolts (not shown). The lock plate 5 is composed by including: a substantially horizontal base portion 5b that enters between the intermediate support piece 6c and the lower support piece 6d in a state where the seat back 1 is rising; a first attachment piece 5a protruding upward from an outer terminal end of the base portion 5b in the vehicle width direction; and a second attachment piece 5a protruding downward therefrom. In the respective attachment pieces 5a, bolt attachment holes through which the bolts are inserted are formed, and the lock plate 5 is fixed to the vehicle body by tightening the bolts while interposing these attachment pieces 5a therebetween.

In the base portion 5b of the lock plate 5, a guide hole 5c and the lock holes 5d are formed to penetrate therethrough. The guide hole 5c is formed into a slit shape along the rotation direction of the seat back 1, and the second arm portion 11b of the lift lever 11 is adapted to enter into the guide hole 5c in the state where the seat back 1 is rising. The plurality of lock holes 5d are provided in multi stages at an appropriate interval along the rotation direction of the seat back 1 (along an extended direction of the guide hole 5c) on the outside of the guide hole 5c in the vehicle width direction.

In the state where the seat back 1 is rising, the engagement portion 7b of the lock pin 7 enters into and engages with one of the lock holes 5d of the lock plate 5 by the urging force of the spring 12, whereby the seat back 1 is held at the predetermined rising angle. Note that the rising angle of the seat back 1 is changed depending on which of the plurality of lock holes 5d the lock pin 7 enters into and engages with.

Next, a description will be made of functions of the locking device 3 for the seat back of this embodiment at the time when the seat back is rotated to be inclined forward and at the time when the seat back is rotated to rise.

a. When Seat Back is Rotated to Rise

Figure 6:
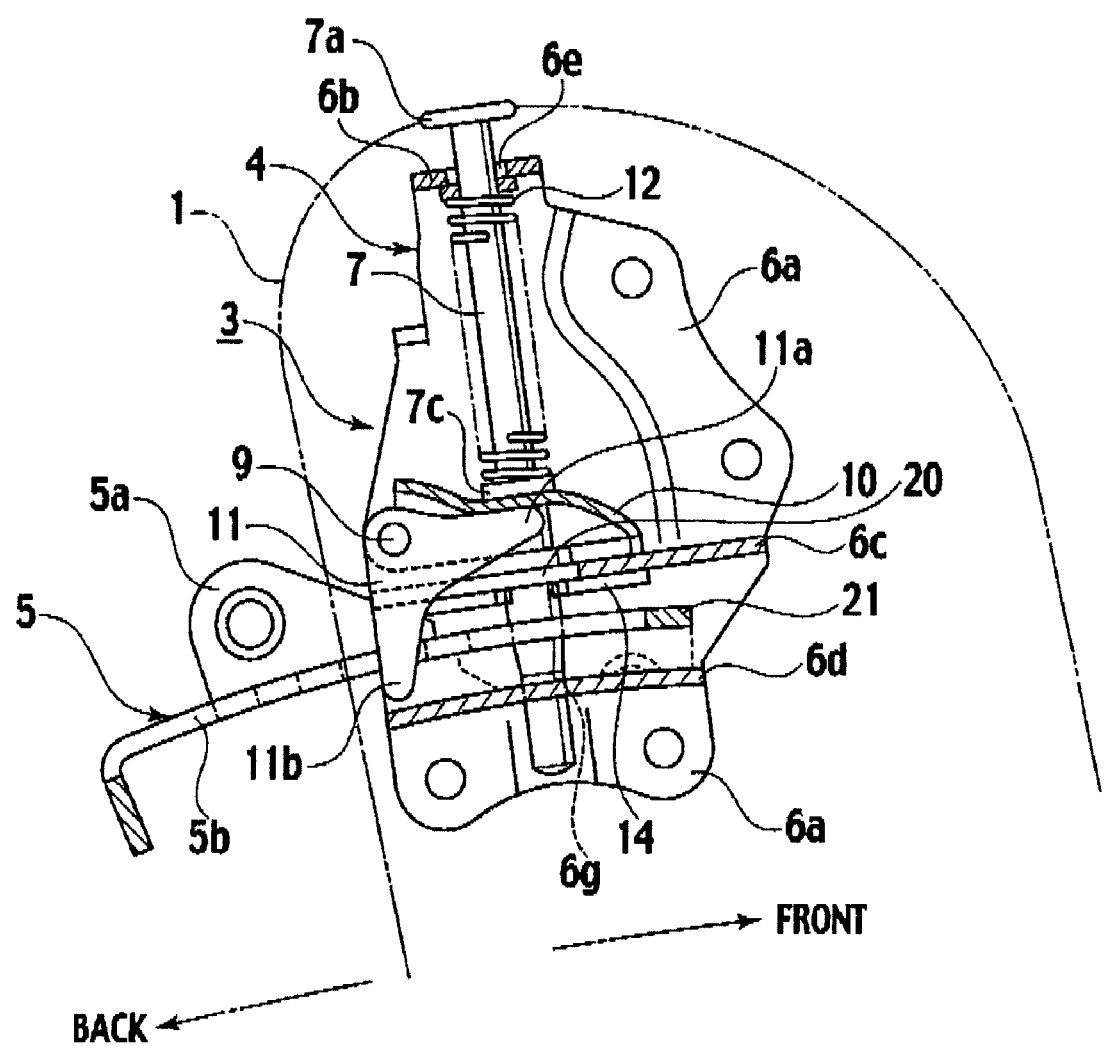
FIG. 6 is a cross-sectional view taken along a line A-A in FIG. 4, showing the locked state.
Figure 8:
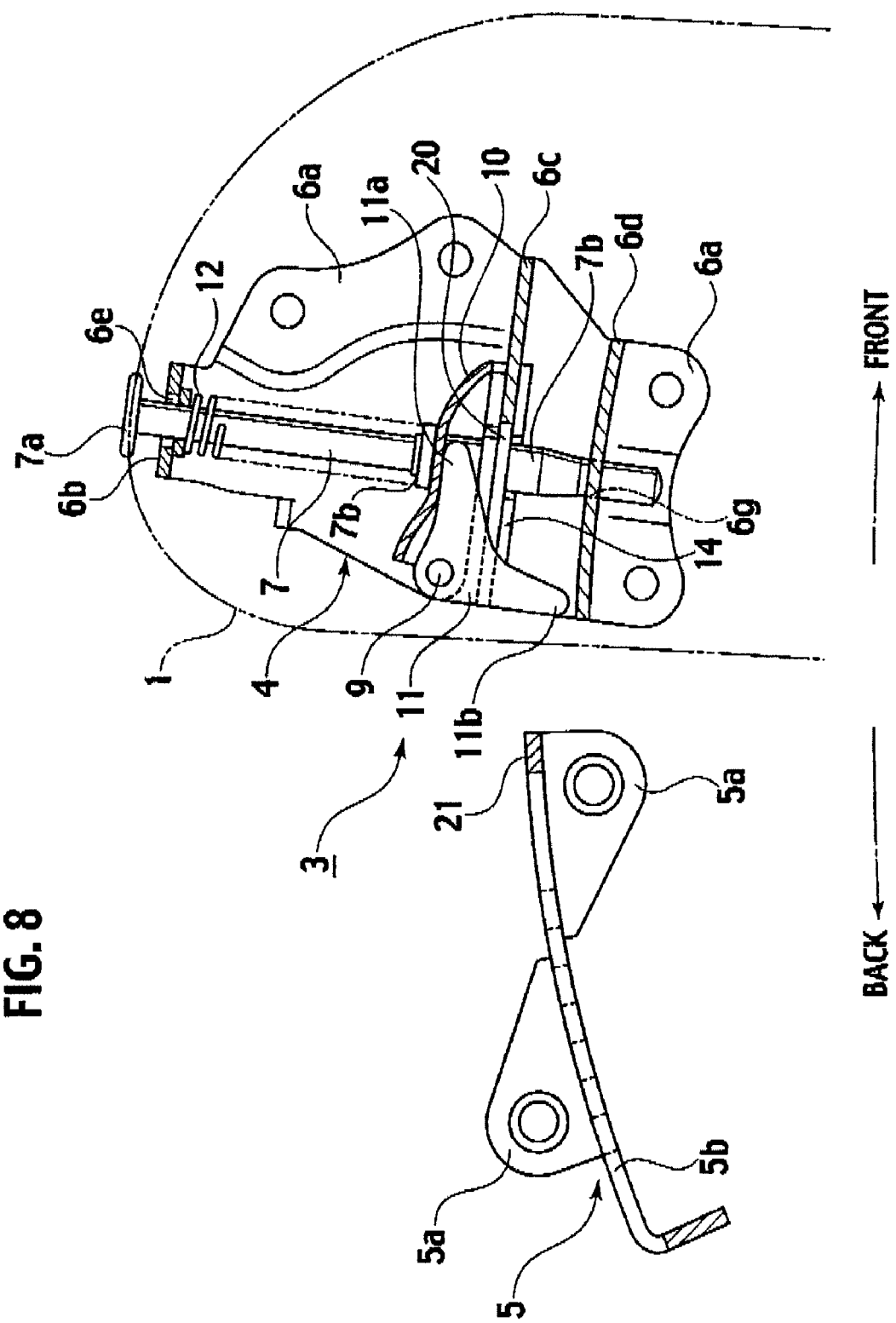
FIG. 8 is a cross-sectional view taken along the line A-A in FIG. 4, showing a state where the seat back is rotated to be inclined forward.
Figure 9:
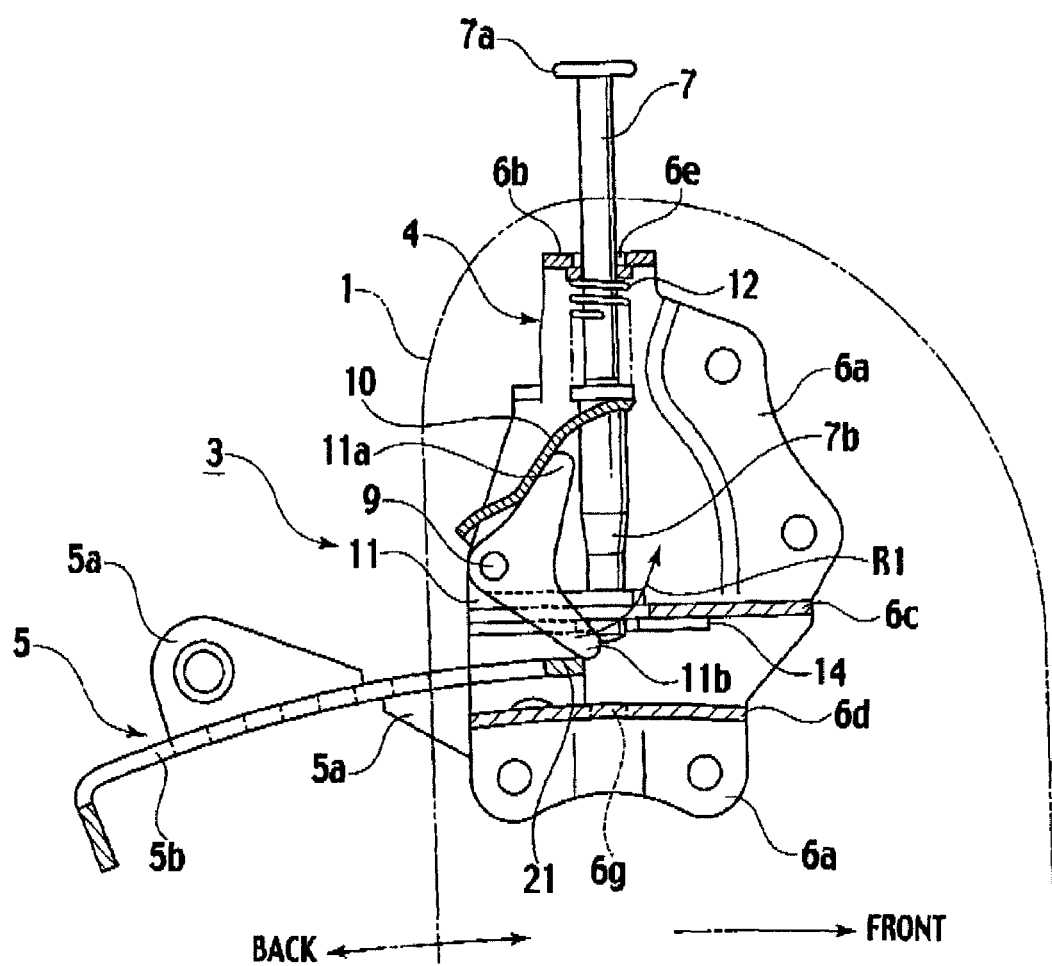
FIG. 9 is a cross-sectional view taken along the line A-A in FIG. 4, showing a state where the seat back is rotated to rise.

Such rising rotation of the seat back 1 is performed by raising the seat back 1 from the forward inclined position to the rising position. At the time when the seat back 1 is rotated to rise, the seat back 1 is rotated to rise from the forward inclined position toward the rear of the vehicle as shown in FIG. 8, FIG. 9 and FIG. 6 in this order. Then, first, as shown in FIG. 9, the second arm portion 11b of the lift lever 11 abuts on a front end edge 21 of the lock plate 5, and is lifted up, and the lift lever 11 rotates backward (rotates positively) against the urging force of the spring 13 (refer to an arrow R1 of FIG. 9). Then, the first arm portion 11a of the lift lever 11 lifts up the lock pin 7 to the release position while interposing the lift plate 10 therebetween. In such a way, the lock pin 7 is avoided colliding with the front end of the lock plate 5 while the seat back 1 is being rotated to rise.

Next, the rising rotation shifts from a state shown in FIG. 9 to a state shown in FIG. 6. At this time, the second arm portion 11b of the lift lever 11 gets over the front end edge 21 of the lock plate 5, and gradually enters into the guide hole 5c while rotating forward (rotating reversely) toward the initial position by the urging force of the spring 13. Then, the lock pin 7 enters into and engages with the lock hole 5d by the urging force of the spring 12, the seat back 1 is held at the predetermined rising angle, and the locking of the seat back 1 is completed.

b. When Seat Back is Rotated to be Inclined Forward

In order to rotate the seat back 1 to incline forward, first, the locking device is released. An operation of releasing the locking device is performed by picking up the flange portion 7a of the lock pin 7 and pulling the lock pin 7 upward against the urging force of the spring 12. In such a way, the engagement portion 7b of the lock pin 7 is disengaged from the lock hole 5d, thus making it possible to rotate the seat back 1 to incline forward.

Figure 7:
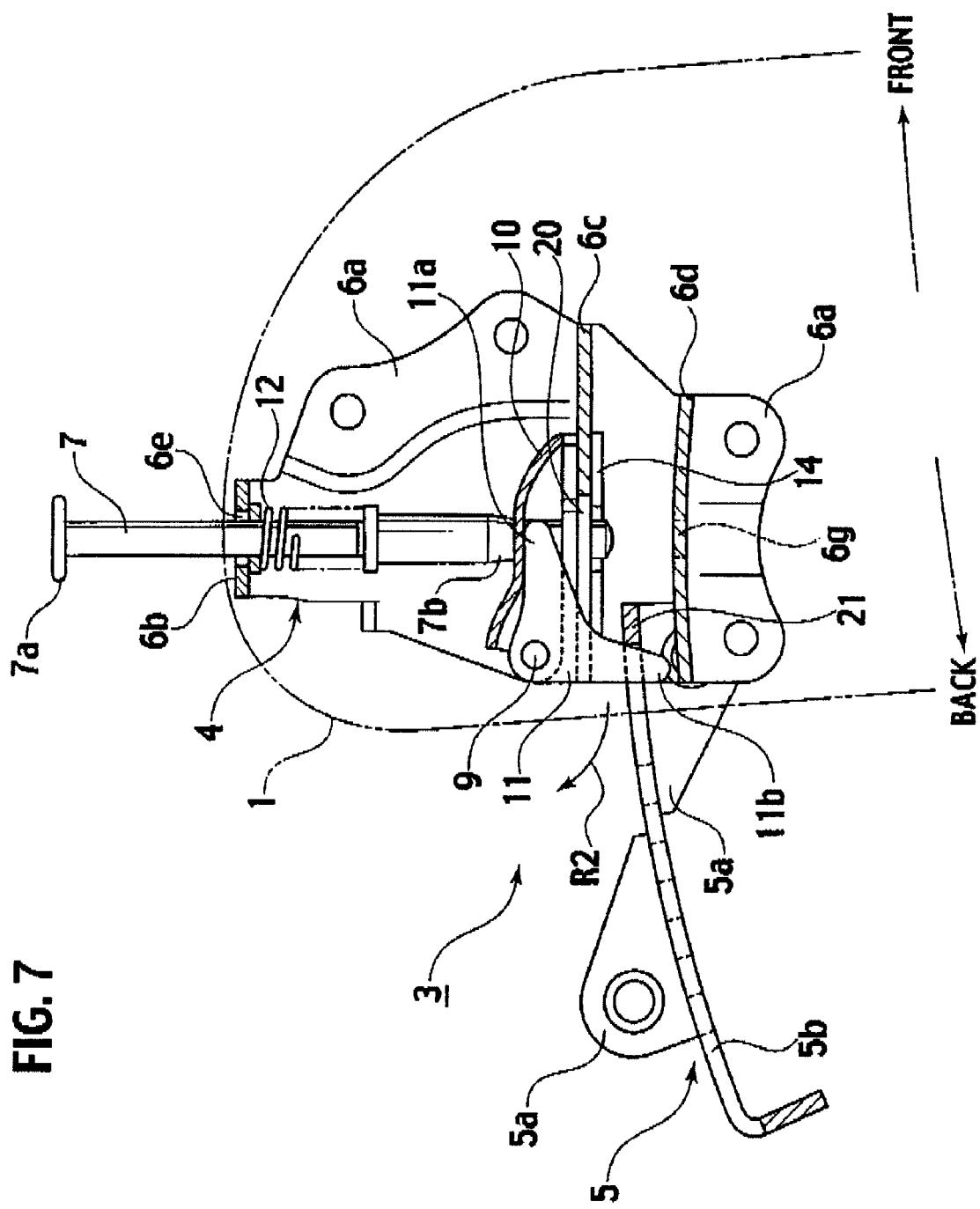
FIG. 7 is a cross-sectional view taken along the line A-A in FIG. 4, showing a state where a lock pin is operated to be released.

When the seat back 1 is rotated to be inclined forward as shown in FIG. 6, FIG. 7 and FIG. 8 in this order from such a state where the seat back 1 is held at the rising position, the lift lever 11 gradually moves forward in the guide hole 5c following this rotation of the seat back 1. When the second arm portion 11b abuts on the front end edge 21 of the guide hole 5c as shown in FIG. 7, the second arm portion 11b is rotated forward (rotated reversely) from the initial position against the urging force of the spring 13 (refer to an arrow R2 of FIG. 7). Next, when the second arm portion 11b gets over the front end edge 21 of the guide hole 5c, the second arm portion 11b gradually escapes from the guide hole 5c while rotating backward (rotating positively) toward the initial position against the urging force of the spring 13.

Note that, though the operation of releasing the lock pin 7 at the time of such self-locking is performed through the lift plate 10 in the above-described embodiment, in the present invention, the lift plate 10 may be removed, and the lift lever 11 may be allowed to directly perform the operation of releasing the lock pin 7.

c. Release Prevention Mechanism

Next, a description will be made of a release prevention mechanism that prevents the locking device 3 from being unintendedly released when a large load is applied to the seat back 1 from the rear of the vehicle toward the front of the vehicle.

Onto a back surface of the intermediate support piece 6c of the base plate 6, an additional plate 14 is attached along the slit portion 20. The additional plate 14 is attached more on the lock pin 7 side than the slit portion 20, and a step difference portion 14c is formed on a side surface thereof, which faces to the slit portion 20. This step difference portion 14c plays a role of the release prevention mechanism that prevents the locking device 3 from being unintendedly released when the large load is applied to the seat back 1 from the rear of the vehicle toward the front of the vehicle.

A description of the above will be made below more in detail. When the seat back 1 is held at the rising position as shown in FIG. 1, the lock pin 7 engages with the lock hole 5d of the lock plate 5, and the second arm portion 11b of the lift lever 11 is located in the guide hole 5c of the lock plate 5. When the large load is applied to the seat back 1 from the rear of the vehicle toward the front of the vehicle in this state, the seat back 1 rotates forward about the lock pin 7 along a substantially horizontal direction (refer to an arrow A in FIG. 1). At this time, the locking mechanism 4 (base plate 6, lock pin 7, lift plate 10, lift lever 11) fixed to the seat back 1 will also rotate forward about the lock pin 7 along the horizontal direction (refer to arrows A in FIG. 10 and FIG. 11).

Figure 10:
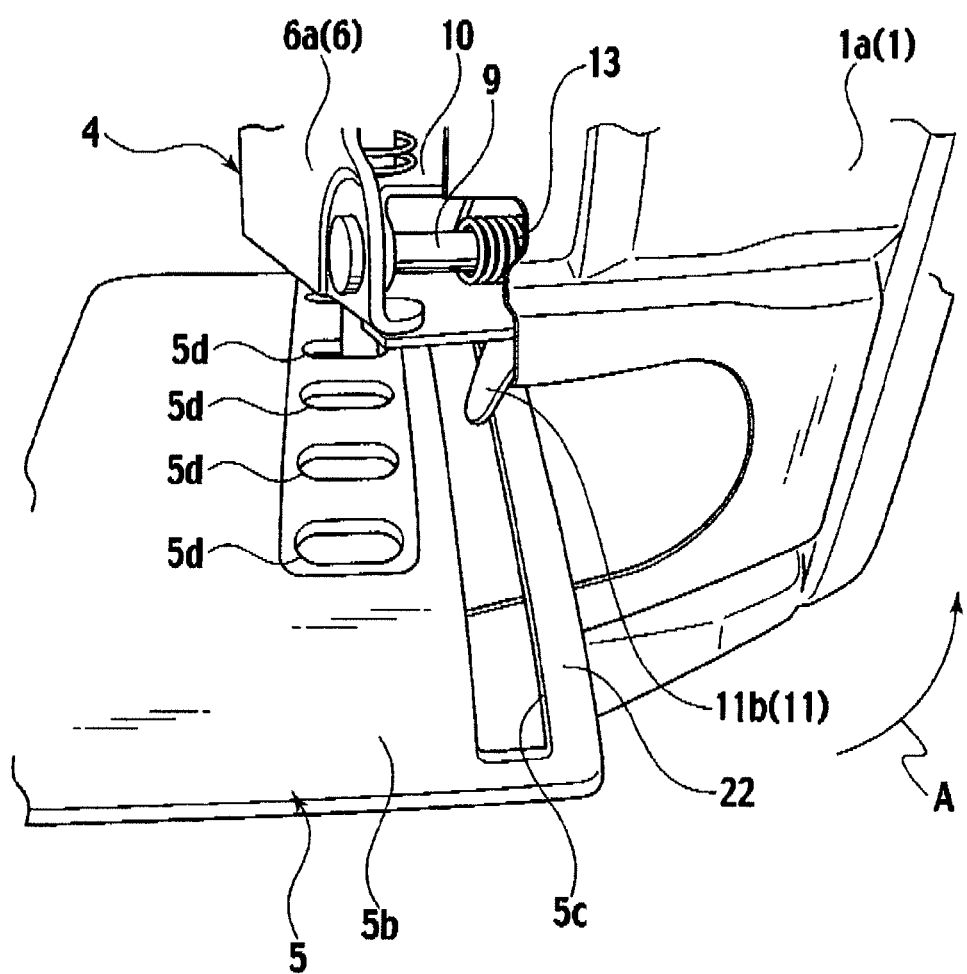
FIG. 10 is a perspective view of the seat back equipped with the locking device of the first embodiment, showing a state where a load is applied thereto from rear.
Figure 11A:
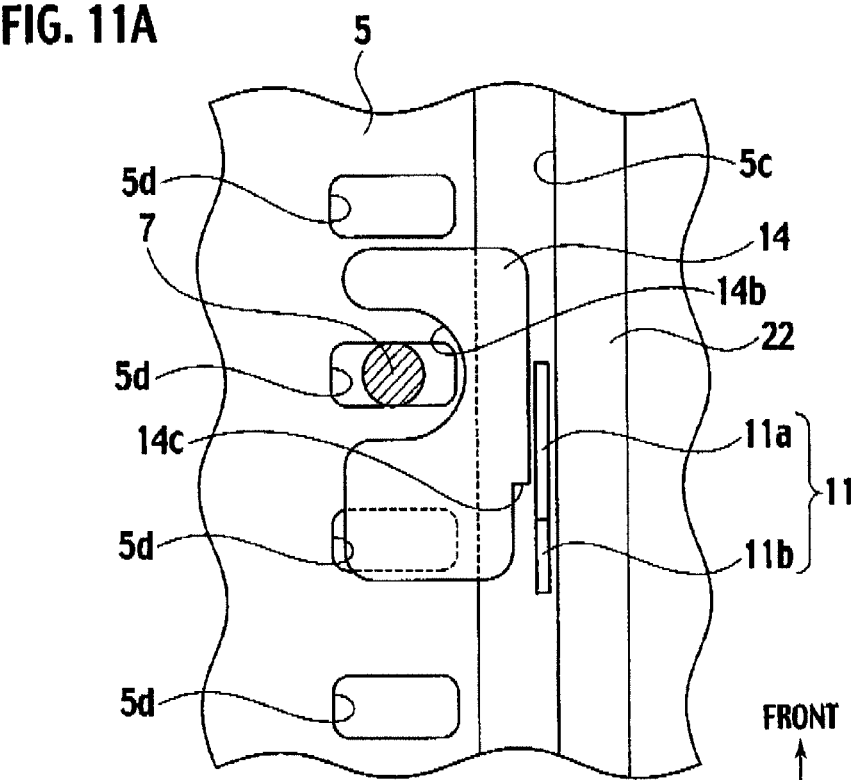
FIGS. 11A and 11B are views for explaining a behavior of a lift plate when the load shown in FIG. 10 is applied thereto.
Figure 11B:
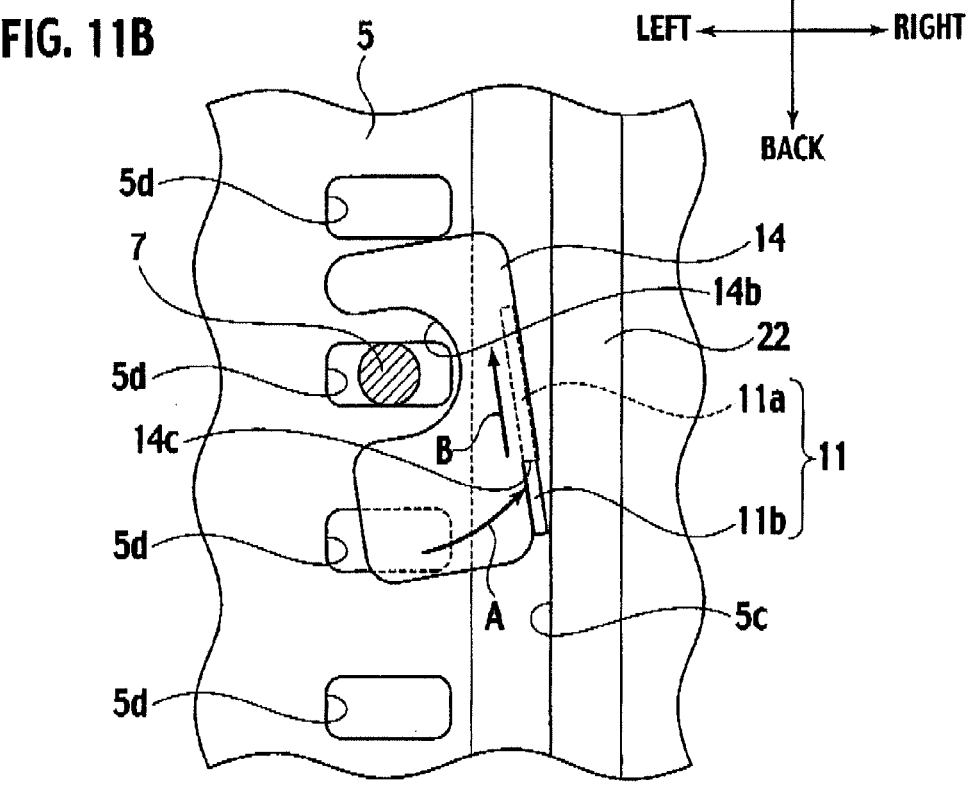

When the seat back 1 rotates largely, the second arm portion 11b of the lift lever 11 pivotally attached onto the base plate 6 of the locking mechanism 4 abuts on a peripheral edge of the guide hole 5c of the lock plate 5 as shown in FIG. 10 and FIG. 11D, and is going to rotate backward (rotate positively) (refer to an arrow B in FIG. 11B). More specifically, the second arm portion 11b of the lift lever 11 abuts on a side edge portion 22 on an opposite side to the lock pin 7 while interposing the guide hole 5c therebetween among peripheral edges of the guide hole 5c.

At this time, in this embodiment, as shown in FIG. 11B, the second arm portion 11b of the lift lever 11 going to rotate backward (rotate positively) is caught by the step difference portion 14c provided at the side of the lock pin 7 side in the peripheral edge of the slit portion 20 of the base plate 6, whereby the lift lever 11 is prevented from rotating backward (rotating positively).

Accordingly, in accordance with this embodiment, when the large load is applied to the seat back 1 from the rear of the vehicle toward the front of the vehicle, for example, at the time of the vehicle collision, and the base plate 6 rotates forward about the lock pin 7 along the horizontal direction, even if the second arm portion 11b of the lift lever 11 abuts on the side edge portion 22 of the guide hole 5c of the lock plate 5, and the lift lever 11 is going to rotate positively, the lift lever 11 is inhibited from rotating positively by the step difference portion 14c of the base plate 6. Accordingly, when the large load is applied to the seat back 1 from the rear of the vehicle toward the front of the vehicle, for example, at the time of the vehicle collision, the locking device 3 can be prevented from being released.

Effects of this embodiment will be listed below.

(1) The locking device 3 of the seat back 1 of this embodiment includes such release preventing means 14c for preventing the lift lever 11 from rotating positively by the fact that the second arm portion 11b of the lift lever 11 abuts on the side edge portion 22 of the guide hole 5d of the lock plate 5 when the base plate 6 rotates forward along the horizontal direction about the lock pin 7 at the time when the seat back 1 is held at the rising position as shown in FIG. 1. Accordingly, in accordance with this embodiment, the locking device 3 can be prevented from being unintendedly released when the large load is applied to the seat back 1 from the rear of the vehicle toward the front of the vehicle, for example, at the time of the vehicle collision.

(2) In this embodiment, the release preventing means 14c is the step difference portion 14c provided at the slit portion 20 of the base plate 6. Accordingly, the release preventing means can be composed by a simple configuration, and production cost is reduced.

(3) In this embodiment, the step difference portion 14c provided at the slit portion 20 of the base plate 6 is formed on the additional plate 14 provided as a separate body from the base plate 6 and attached onto the base plate 6. Accordingly, the release preventing means 14c can be composed without changing the existing base plate 6, that is, only by adding the additional plate 14 while keeping on using the existing device. Therefore, the production cost is further reduced.

Second Embodiment

Next, a description will be made of a second embodiment of the present invention while referring to FIGS. 12 and 13.

Figure 12:
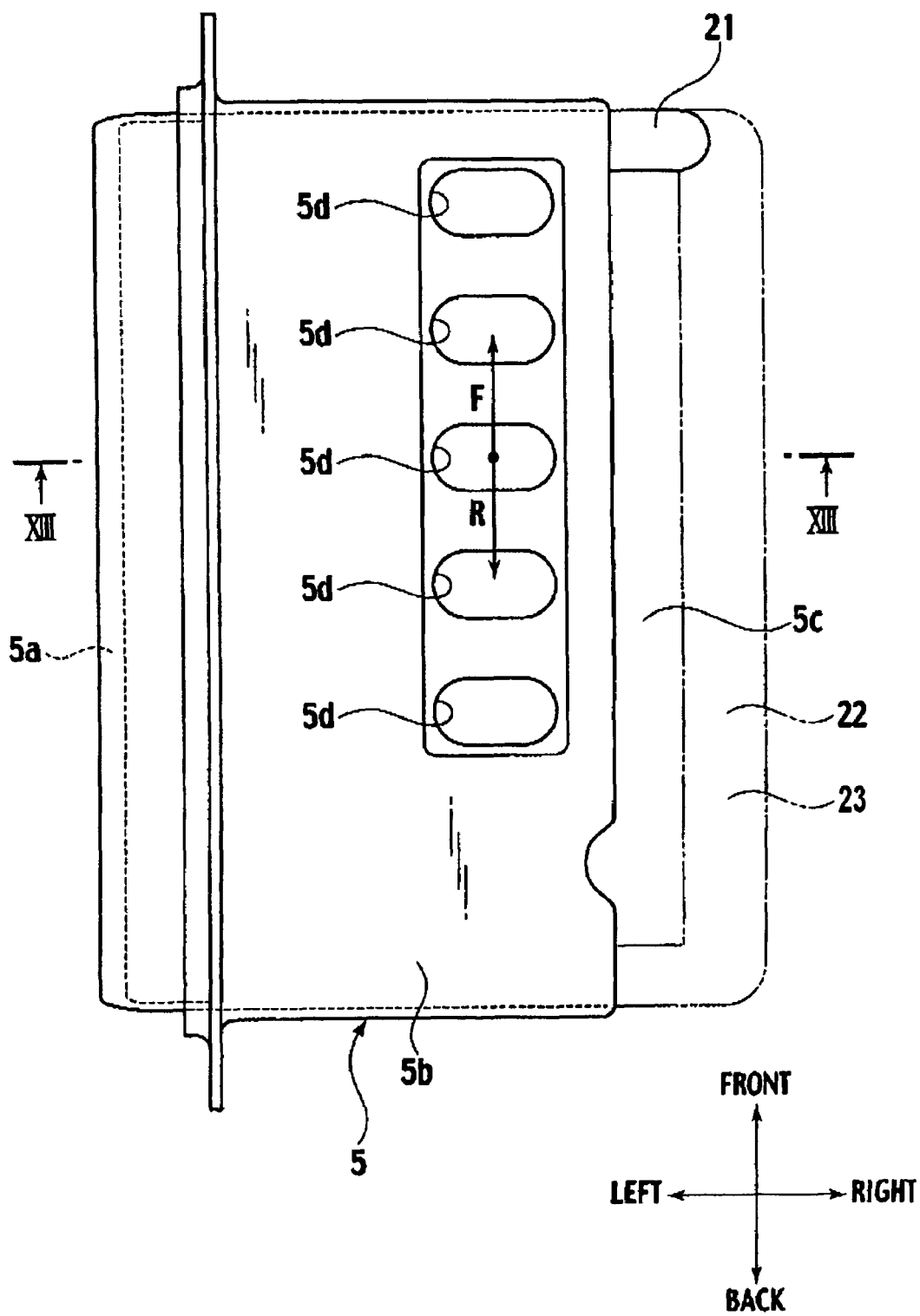
FIG. 12 is a plan view of a lock plate of a locking device of a second embodiment of the present invention.
Figure 13:
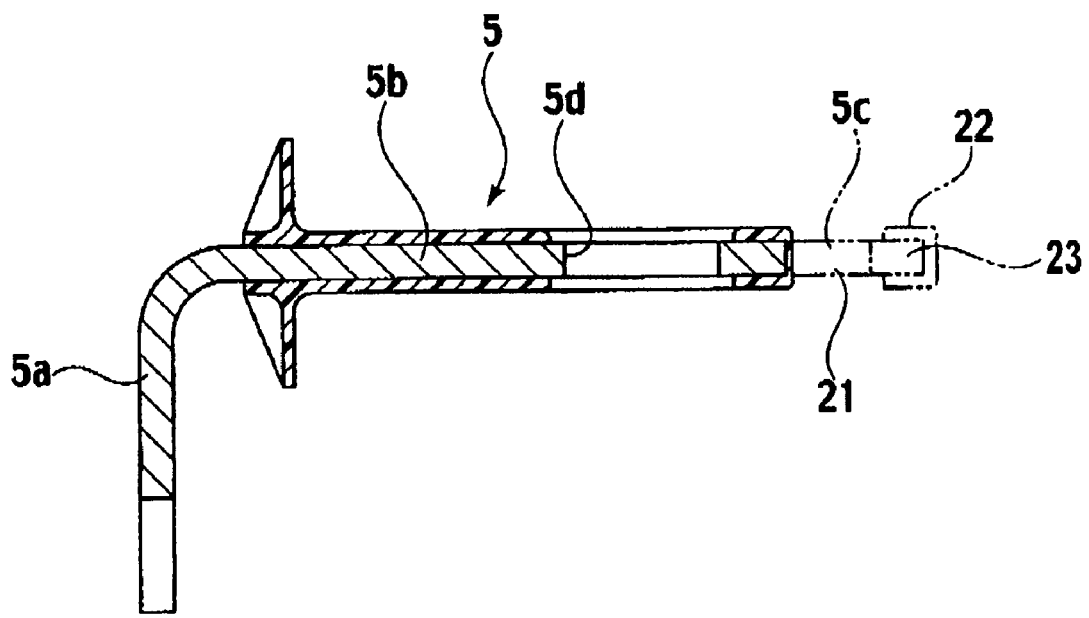

FIGS. 12 and 13 are views showing a lock plate 5 of the locking device for the seat back according to the second embodiment.

As shown in FIGS. 12 and 13, in the lock plate 5 of the second embodiment, the entirety of the side edge portion 22 on the opposite side to the lock pin 7 among the peripheral edge of the guide hole 5c of the lock plate 5 is provided as a cutout 23. Specifically, in this embodiment, a structure is adopted, in which the portion 22 on which the second arm portion 11b of the lift lever 11 abuts when the large load is applied to the seat back 1 from the rear of the vehicle toward the front of the vehicle is not present. Accordingly, in this embodiment, since the structure is adopted, in which the portion 22 causing the second arm portion 11b of the lift lever 11 to rotate positively when the large load is applied to the seat back 1 from the rear of the vehicle toward the front of the vehicle is not present, the second arm portion 11b of the lift lever is prevented from rotating positively. As a result, the locking device can be prevented from being unintendedly released when the large load is applied to the seat back 1 from the rear of the vehicle toward the front of the vehicle, for example, at the time of the vehicle collision.

Note that it is needless to say that the cutout 23 may be partially provided on the side edge portion 22 on the opposite side to the lock pin 7 among the peripheral edge of the guide hole 5c of the lock plate 5.

As described above, in the above-described first to second embodiment, since the release prevention mechanisms are provided, the locking device 3 can be prevented from being unintendedly released when the large load is applied to the seat back 1 from the rear of the vehicle toward the front of the vehicle.

Moreover, the present invention incorporates a structure in which the first embodiment and the second embodiment are combined with each other. Furthermore, the present invention should not be interpreted limitedly only by the above-described embodiments, and the embodiments can be modified as appropriate within the scope of the technical concept of the present invention.

INDUSTRIAL APPLICABILITY

In each of the above-described embodiments, the description has been made of the case where the locking device of the present invention is applied to the rear seat of the automobile; however the locking device of the present invention can also be applied to a front seat of the automobile, and moreover, can be applied not only to such seats of the automobile but also to vehicular seats mounted on other vehicles and the like.

What is claimed is:

1. A locking device for a seat back, comprising:
a lock plate fixed to a vehicle body and having one or more lock holes;
a base plate fixed to a seat back;
a lock pin freely slidably supported on the base plate and urged by first urging means, the lock pin entering into one of the lock holes of the lock plate at a predetermined rising angle, thereby holding the seat back at the predetermined rising angle;
a lift lever having a first arm portion and a second arm portion and pivotally attached onto the base plate, the lift lever being urged to an initial position by second urging means; and
a guide hole formed in the lock plate, the guide hole allowing the second arm portion of the lift lever to enter thereinto when the seat back is held at a rising position,
in which, when the seat back is rotated to rise, the second arm portion is lifted up by a front end edge of the guide hole, and rotates positively from the initial position, and then enters into the guide hole while rotating reversely, whereby the first arm portion pushes up the lock pin to thereby avoid the lock pin colliding with the lock plate, and thereafter, the first arm portion permits the lock pin to enter into the lock hole,
wherein, on the base plate, there is provided a step difference portion that prevents the lift lever from rotating positively by a fact that the second arm portion of the lift lever abuts on a side edge portion of the guide hole of the lock plate when the base plate rotates forward about the lock pin along a horizontal direction in an occasion where a load is applied to the seat back from a rear direction when the seat back is held at the rising position.

2. A locking device for a seat back, comprising:
a lock plate fixed to a vehicle body and having one or more lock holes;
a base plate fixed to a seat back;
a lock pin freely slidably supported on the base plate and urged by first urging means, the lock pin entering into one of the lock holes of the lock plate at a predetermined rising angle, thereby holding the seat back at the predetermined rising angle;
a lift lever having a first arm portion and a second arm portion and pivotally attached onto the base plate, the lift lever being urged to an initial position by second urging means; and
a guide hole formed in the lock plate, the guide hole allowing the second arm portion of the lift lever to enter thereinto when the seat back is held at a rising position,
in which, when the seat back is rotated to rise, the second arm portion is lifted up by a front end edge of the guide hole, and rotates positively from the initial position, and then enters into the guide hole while rotating reversely, whereby the first arm portion pushes up the lock pin to thereby avoid the lock pin colliding with the lock plate, and thereafter, the first arm portion permits the lock pin to enter into the lock hole, wherein a cutout, which prevents the second arm portion of the lift lever from abutting on a peripheral edge portion of the guide hole of the lock plate when the base plate rotates forward about the lock pin along a horizontal direction when the seat back is held at the rising position, is provided in at least a part of a side edge portion of the guide hole of the lock plate on an opposite side to the lock pin among a peripheral edge of the guide hole of the lock plate.

3. The locking device of claim 2, wherein the cutout is provided on an entirety of the side edge portion on the opposite side to the lock pin.

4. The locking device of claim 2, wherein the cutout is provided such that the lift lever is prevented from rotating positively by the second arm portion of the lift lever not abutting on the side edge portion of the guide hole of the lock plate when the base plate rotates forward about the lock pin along the horizontal direction in an occasion where a load is applied to the seat back from a rear direction when the seat back is held at the rising position.

5. The locking device of claim 2, wherein the cutout removes the side edge portion on the opposite side to the lock pin.

* * * * *